United States Patent
Zamora Esquivel et al.

(10) Patent No.: US 10,515,636 B2
(45) Date of Patent: Dec. 24, 2019

(54) SPEECH RECOGNITION USING DEPTH INFORMATION

(71) Applicant: Intel Corporation, Santa Clara, CA (US)

(72) Inventors: Julio C. Zamora Esquivel, Zapopan (MX); Hector A. Cordourier Maruri, Guadalajara (MX); Paulo Lopez Meyer, Tlaquepaque (MX); Alejandro Ibarra Von Borstel, Zapopan (MX); Willem M. Beltman, West Linn, OR (US); Jose R. Camacho Perez, Guadalajara (MX); Omesh Tickoo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/387,508

(22) Filed: Dec. 21, 2016

(65) Prior Publication Data

US 2018/0174586 A1    Jun. 21, 2018

(51) Int. Cl.
| | |
|---|---|
| *G10L 15/25* | (2013.01) |
| *G06K 9/00* | (2006.01) |
| *G10L 15/16* | (2006.01) |
| *G06K 9/62* | (2006.01) |
| *G10L 15/08* | (2006.01) |

(52) U.S. Cl.
CPC .......... *G10L 15/25* (2013.01); *G06K 9/00248* (2013.01); *G06K 9/00281* (2013.01); *G06K 9/00335* (2013.01); *G06K 9/627* (2013.01); *G10L 15/16* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 2011/0274316 A1* | 11/2011 | Jeong | ................. H04N 21/4223 382/103 |
| 2016/0284363 A1 | 9/2016 | Von Borstel et al. | |

OTHER PUBLICATIONS

Yargiç, Alper, and Muzaffer Doğan. "A lip reading application on ms kinect camera." Innovations in Intelligent Systems and Applications (INISTA), 2013 IEEE International Symposium on. IEEE, 2013.*

(Continued)

*Primary Examiner* — Vu Le
*Assistant Examiner* — Tracy Mangialaschi
(74) *Attorney, Agent, or Firm* — International IP Law Group, P.L.L.C.

(57) ABSTRACT

An example apparatus for detecting speech includes an image receiver to receive depth information corresponding to a face. The apparatus also includes a landmark detector to detect the face comprising lips and track a plurality of descriptor points comprising lip descriptor points located around the lips. The apparatus further includes a descriptor computer to calculate a plurality of descriptor features based on the tracked descriptor points. The apparatus includes a pattern generator to generate a visual pattern of the descriptor features over time. The apparatus also further includes a speech recognition engine to detect speech based on the generated visual pattern.

20 Claims, 13 Drawing Sheets

(56) References Cited

OTHER PUBLICATIONS

Werda, Salah, Walid Mandi, and Abdelmajid Ben Hamadou. "Lip Localization and Viseme Classification for Visual Speech Recognition." International Journal of Computing & Information Sciences 5.1 (2007).*

Noda, Kuniaki, et al. "Audio-visual speech recognition using deep learning." Applied Intelligence 42.4 (2015): 722-737.*

T. Yoshinaga, S. Tamura, K. Iwano and S. Furui, "Audio-visual speech recognition using new lip features extracted from side-face images," in COST278 and ISCA Tutorial and Research Workshop (ITRW) on Robustness Issues in Conversational Interaction, 2004.*

Frisky, Aufaclav Zatu Kusuma, et al. "Lip-based visual speech recognition system." Security Technology (ICCST), 2015 International Carnahan Conference on. IEEE, 2015.*

Li, Xiaokun, and Chiman Kwan. "Geometrical feature extraction for robust speech recognition." Signals, Systems and Computers, 2005. Conference Record of the Thirty-Ninth Asilomar Conference on. IEEE, 2005. (Year: 2005).*

Lu, Longbin, et al. "Video analysis using spatiotemporal descriptor and kernel extreme learning machine for lip reading." Journal of Electronic Imaging 24.5 (2015): 053023. (Year: 2015).*

Ma X, Zhang H. Joint geometry and gray-level histogram model for lip-reading. InIntelligent Control and Automation (WCICA), 2016 12th World Congress on Jun. 12, 2016 (pp. 3083-3087). IEEE. (Year: 2016).*

Alizadeh, S., R. Boostani, and V. Asadpour. "Lip feature extraction and reduction for HMM-based visual speech recognition systems ." Signal Processing, 2008. ICSP 2008. 9th International Conference on. IEEE, 2008. (Year: 2008).*

Gernoth, Thorsten, Ralph Kricke, and Rolf-Rainer Grigat. "Mouth center detection under active near infrared illumination." 6th WSEAS International Conference on Signal Processing (SIP'07). 2007. (Year: 2007).*

Huang et al., "Audio-visual speech recognition using an infrared headset", Speech Communication, vol. 44, 2004 14 pages, USA.

Massaro et al., "Read my lips: speech distortions in musical lyrics can be overcome (slightly) by facial information", Speech Communication, vol. 51, 2009, 18 pages, USA.

Potamianos et al., "Improved ROI and within frame discriminant features for lipreading," Proceedings of the International Conference on Image Processing, Thessaloniki, 2001, 4 pages.

* cited by examiner

300

400

500

600

700

800

900

1100

SPEECH RECOGNITION USING DEPTH INFORMATION

BACKGROUND

Automated speech recognition can be used to recognize and translate a spoken language into text by computers and computerized devices. For example, the text may then be used by smart devices and robotics for a variety of applications.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
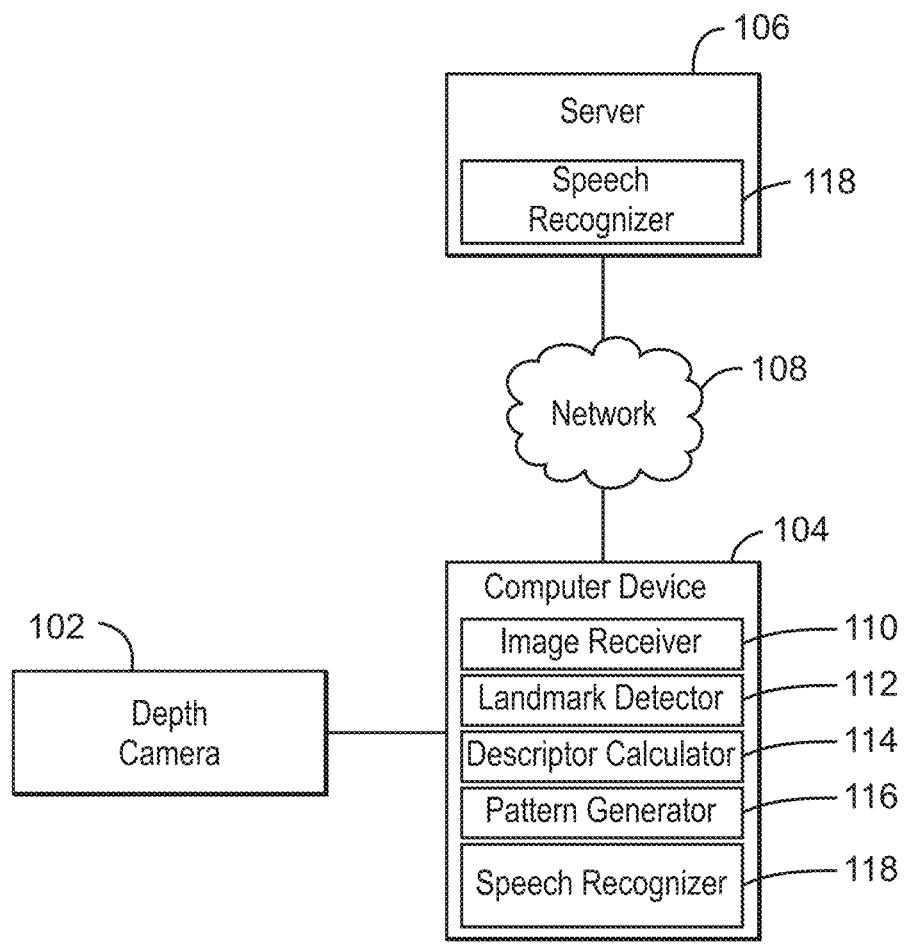
FIG. 1 is a block diagram illustrating an example system for recognizing speech using depth information.

As discussed above, automated speech recognition can be used to recognize and translate a spoken language into text by computers and computerized devices. For example, voice samples can be recorded, and speech in the voice sample recognized and translated into text by a computer. However, such systems may fail in noisy environments. Moreover, a number of devices may operate in noisy environments. For example, such devices may include jukeboxes, vending machines, industrial machines, and vehicles.

The present disclosure relates generally to techniques for speech recognition using calculated descriptor features. Specifically, the techniques described herein include an apparatus, method and system for recognizing speech using depth information. An example apparatus includes an image receiver to receive depth information corresponding to a face. The apparatus includes a landmark detector to detect the face comprising lips and track a plurality of descriptor points comprising lip descriptor points located around the lips. The apparatus further includes a descriptor computer to calculate a plurality of descriptor features based on the tracked descriptor points. The apparatus also includes a pattern generator to generate a visual pattern of the descriptor features over time. The apparatus further includes a speech recognizer to recognize speech based on the generated visual pattern.

The techniques described herein thus enable speech to be recognized using depth information. For example, the speech may be recognized without any received audio of the speech. In particular, the depth information may be used to detect lip movements via lip descriptors. Moreover, the techniques may provide a scale, translation, and rotation invariant solution to speech recognition. For example, the techniques described herein may be invariant to face roll, yaw, and pitch. In addition, the techniques described herein may allow speech to be recognized in noisy conditions and with some occlusion of the lips. By using lip descriptor points as a reference, the generated visual pattern of features has an advantage of being resilient to scale, translation, and position of the user's head. Using the ratio of the areas explained below to detect voice activity may also result in a more robust approach because it is a scale, translation and rotation invariant. For example, the techniques described herein may not require orthogonal frontal images, and may thus work in a wide range of face rotations. In some examples, the techniques may support up to 360 degrees for roll, +−10 degrees for yaw, and +−10 degrees for pitch. For frontal distance, the techniques described herein may support a range from 30 cm to 70 cm, making them well suited for automotive applications. As used herein, frontal distance is a distance from the front of the device tracking the user's face. In addition, the techniques described herein may be able to perform with partial occlusions of up to 10% of the lips. Thus, speakers may be able to freely move their head about. For example, if the lips are at least 90% visible to the depth camera 102, the techniques described herein may be able to recognize speech of the speaker with partial occlusions. Further, because the descriptor features are a byproduct of the detection of the descriptor points, the techniques described herein may also be more suitable for real-life and unconstraint applications.

In some examples, a small dictionary of keywords may be used to enable command and control of devices using included keywords. Moreover, the techniques described herein can be used by devices to provide more natural and personal interactions with users. For example, the techniques may be used to provide face-to-face interaction in a wide range of unconstrained noisy environments. In some examples, the techniques described herein may also be used in conjunction with other forms of speech recognition to provide more accurate recognition of speech. In some examples, the techniques described herein may also allow more freedom and robustness in applications with different form factors, such as tablets, laptops, kiosks, smartphones, etc. For example, the techniques described herein can be combined into a wearable device with other techniques to provide a multimodal system with highly improved accuracy using suitable sensor fusion techniques.

FIG. 1 is a block diagram illustrating an example system for recognizing speech using depth information. The example system is referred to generally by the reference number 100 and can be implemented in the computing device 1200 below in FIG. 12 using the method 1100 of FIG. 11 below.

The example system 100 includes a depth camera 102, a computer device 104, and a server 106. The server 106 is connected to the computer device 104 via a network 108. For example, the network 108 may be the Internet or any other suitable network. The computer device 104 includes an image receiver 110, a landmark detector 112, a descriptor computer 114, a pattern generator 116, and a speech recognizer 118. The server also includes a speech recognizer 118.

As shown in FIG. 1, a depth camera 102 can capture video of one or more people speaking. For example, the depth camera 102 can detect one or more faces including lips. The image receiver 110 can receive depth information from the depth camera 102. For example, image receiver 110 can receive depth information including descriptor points around the lips of a detected face. The landmark detector 112 can detect the descriptor points around the lips and other descriptor points about the face as describe below. For example, any suitable 3D camera software development kit (SDK) may be used to detect the descriptor points about the face and lips. In some examples, moving facial features may be used to zoom-in on the lips region. For example, the moving facial features can be used to detect a location of the lips and then segment the needed descriptors around and inside the lips. In some examples, the descriptor calculator 114 can generate descriptor features by calculating the angles of the lines among points, among other calculations. The pattern generator 116 can then generate a pattern of the descriptor features over time. For example, the descriptor features may be arranged as a series of columns over time. The speech recognizer 118 can then associate the generated feature patterns to voice and recognize speech based on the patterns. For example, after the pattern generator 116 generates the feature patterns, one or more pattern recognition algorithms in the speech recognizer 118 can be used to recognize the words the speaker uttered.

The diagram of FIG. 1 is not intended to indicate that the example system 100 is to include all of the components shown in FIG. 1. Rather, the example system 100 can be implemented using fewer or additional components not illustrated in FIG. 1 (e.g., additional cameras, computer devices, servers, networks, etc.).

Figure 2:
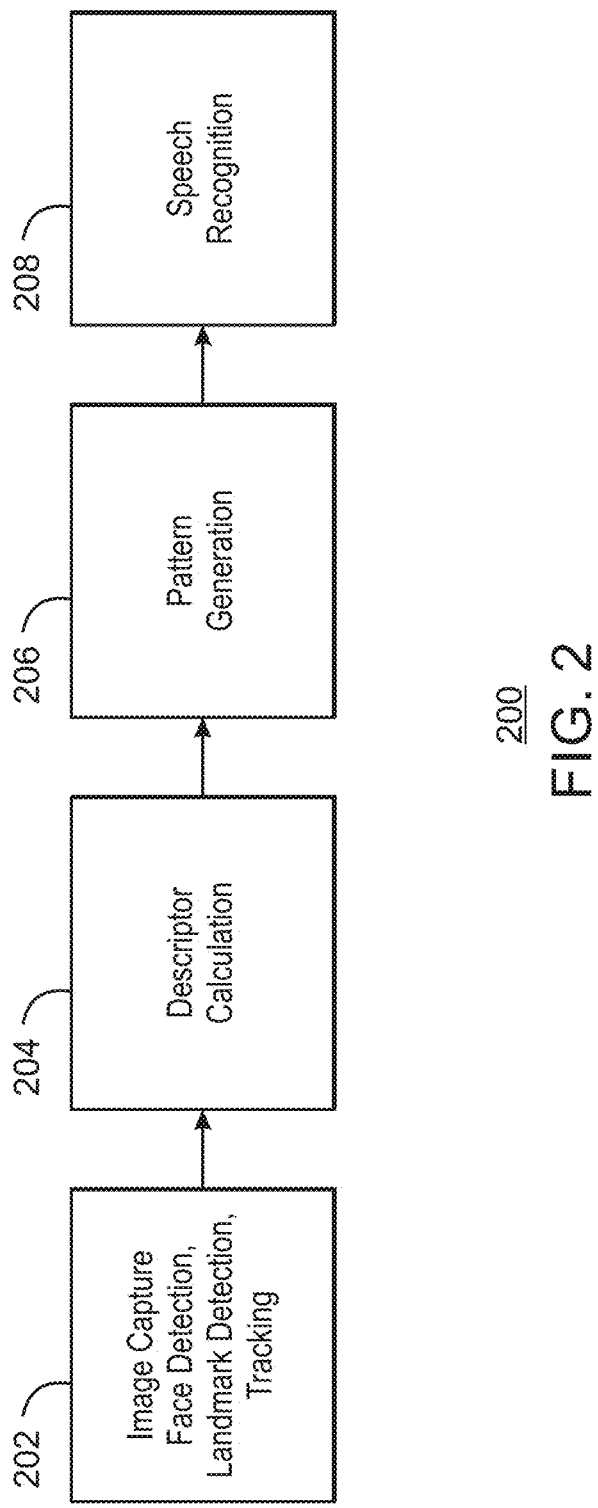
FIG. 2 is a flow chart illustrating an example process for recognizing speech using depth information.

FIG. 2 is a flow chart illustrating an example process for recognizing speech using depth information. The example process is generally referred to by the reference number 200 and can be implemented in the computer device 104 above or the computing device 1200 below.

At block 202, the computing device performs image capture, face detection, landmark detection, and tracking. For example, the computing device may include a depth camera to perform image capture of a face with lips. The image capture may generate depth information. The computing device may then detect the face in the captured depth information. For example, a bounding box may include a recognized face. The computing device may then perform landmark detection. For example, the computing device can identify landmarks including lips, eyes, a nose, etc. In some examples, a number of descriptor points on the lips may be detected. An example set of lip descriptor points is discussed with respect to FIG. 5 below. In some examples, descriptor points associated with the eyes of a user may be detected, as well as a number of descriptor points indicating the contour of the detected face. In some examples, the computing device may track any combination of the detected descriptor points over time.

At block 204, the computing device performs a descriptor calculation. For example, the computing device can calculated one or more descriptor features based on the detected descriptor points as described below. For example, the descriptor features can include an area ratio feature, an eccentricity feature, a cross-ratio feature, among other descriptor features. Examples of these descriptor features are described with respect to FIGS. 4, and 6-8 below.

At block 206, the computing device performs a pattern generation. For example, a set of descriptor features can be visually arranged in a vertical column and displayed horizontally as a pattern over time.

At block 208, the computing device performs a speech recognition. For example, the computing device may apply any suitable speech recognition technique to the generated pattern to detect one or more words. In some examples, a dictionary can be used to provide words to be recognized.

This process flow diagram is not intended to indicate that the blocks of the example process 200 are to be executed in any particular order, or that all of the blocks are to be included in every case. Further, any number of additional blocks not shown may be included within the example process 200, depending on the details of the specific implementation.

Figure 3:
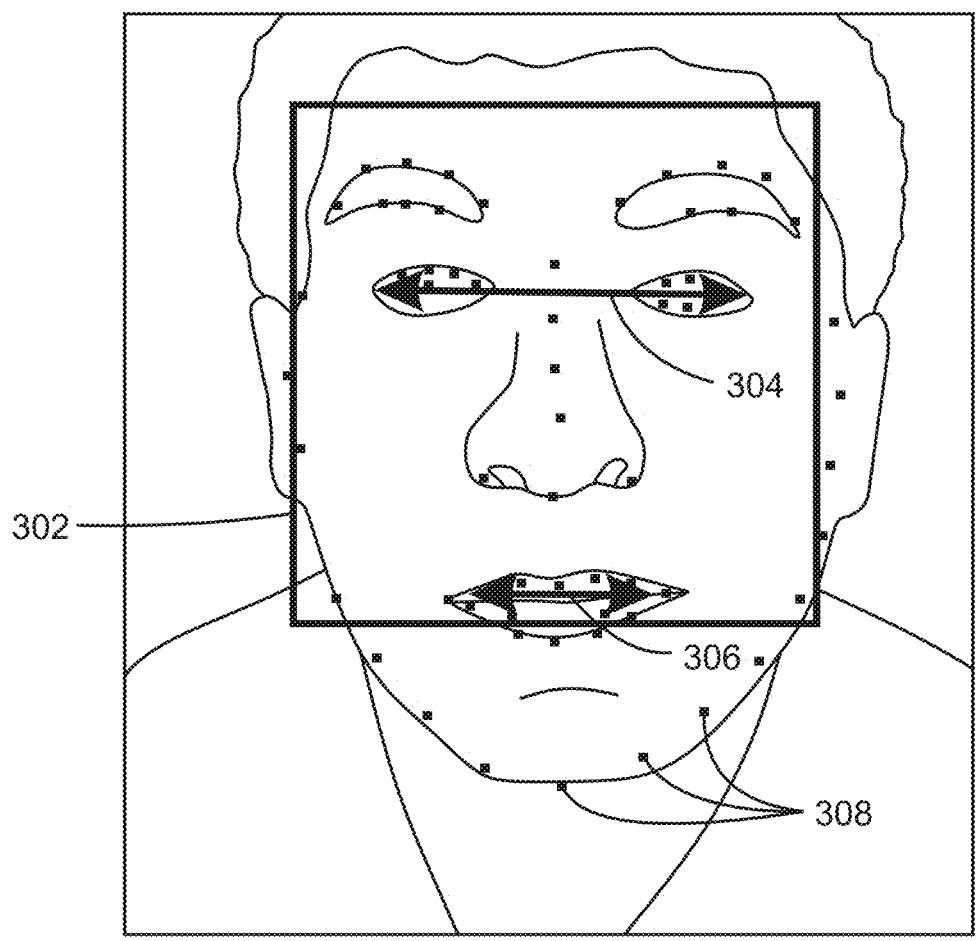
FIG. 3 is a diagram illustrating an example set of segments used to generate a line segment ratio feature.

FIG. 3 is a diagram illustrating an example set of segments used to generate an example line segment ratio feature. The example line segment ratio feature is generally referred to by the reference number 300 and can be implemented in the computing device 1200 below. For example, the line segment ratio feature 300 can be generated using the descriptor calculator 114 of the computer device 104 of FIG. 1, the descriptor calculator 1234 of the computing device 1200 of FIG. 12 below, or the descriptor calculator module 1310 of the computer readable media 1300 of FIG. 13 below.

FIG. 3 shows a set of two line segments 304 and 306. FIG. 3 further also includes a number of descriptor points 308 around landmarks of a detected face. In FIG. 3, a line segment ratio feature can be calculated using a ratio of line segments 304 and 306. For example, the line segment ratio feature can be calculated using the equation:

$$r_{ls} = \frac{A}{B} \qquad \text{Eq. 1}$$

where the line segment ratio $r_{ls}$ is a function of the line segment lengths A, B, corresponding to line segments 306 and 304, respectively. In particular, line segment A 306 occurs on the lips of the face and line segment B 304 occurs between the eyes of the face. In some examples, the line segment ratio feature can then be included as one of the descriptor features used to generate the visual pattern as described in FIG. 8 below and displayed in an example in FIG. 9. The example line segment ratio 300 may be invariant to scale and roll rotation because the segments 304 and 306 may be parallel.

The diagram of FIG. 3 is not intended to indicate that the example line segment ratio feature 300 is to include all of the components shown in FIG. 3. Rather, the example line segment ratio feature 300 can be implemented using fewer or additional components not illustrated in FIG. 3 (e.g., additional line segments, descriptor points, etc.).

Figure 4:
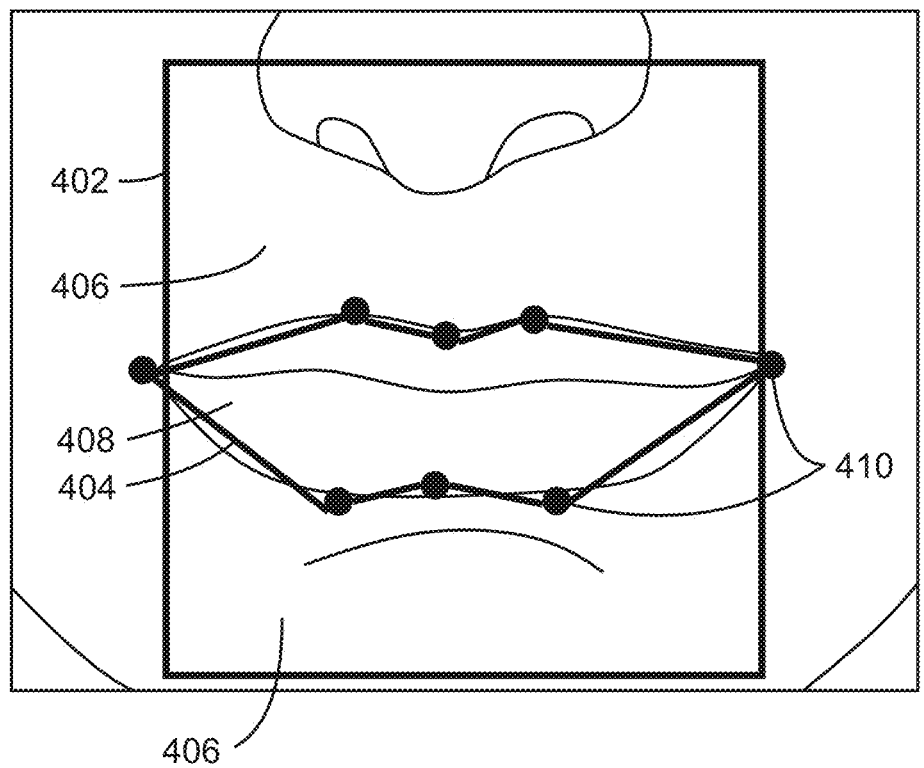
FIG. 4 is a diagram illustrating an example set of geometric descriptors used to generate an area ratio feature.

FIG. 4 is a diagram illustrating an example set of geometric descriptors used to generate an example area ratio feature. The example area ratio feature is generally referred to by the reference number 400 and can be implemented in the computing device 1200 below. For example, the area ratio feature 400 can be generated using the descriptor calculator 114 of the computer device 104 of FIG. 1, the descriptor calculator 1234 of the computing device 1200 of FIG. 12 below, or the descriptor calculator module 1310 of the computer readable media 1300 of FIG. 13 below.

FIG. 4 shows a bounding box 402 enclosing a lower portion of a nose and a set of lips. The lips are enclosed by a set of line segments 404 that form an area 406 outside the lips and an area 408 inside the lips. The line segments 404 are connected at vertices 410.

In the example of FIG. 4, the descriptive geometries formed by line segments 404 can be used to generate an area ratio feature. For example, the descriptive geometries may be areas 406, 408. In some examples, the area 408 can be calculated using the equation:

$$A = \frac{1}{2}\left|\sum_{i=1}^{n} x_i(y_{i+1} - y_{i-1})\right|$$
$$= \frac{1}{2}\left|\sum_{i=1}^{n} y_i(x_{i+1} - x_{i-1})\right|$$
$$= \frac{1}{2}\left|\sum_{i=1}^{n} x_i y_{i+1} - x_{i-1} y_i\right|$$
$$= \frac{1}{2}\left|\sum_{i=1}^{n} \det\begin{pmatrix} x_i & x_{i+1} \\ y_i & y_{i+1} \end{pmatrix}\right|$$

Eq. 2 where the area A is a function of outer lip descriptor points ($x_{i\ldots n}$, $y_{i\ldots n}$). In some examples, to accelerate the computation of area 408, the area 408 can alternatively be calculated using the equation:

$$A_1 = \begin{vmatrix} x_{1_x} y_1 \\ x_{2_x} y_2 \\ x_{3_x} y_3 \\ x_{4_x} y_4 \\ x_{5_x} y_5 \\ x_{6_x} y_6 \\ x_{7_x} y_7 \\ x_{8_x} y_8 \\ x_{9} y_1 \end{vmatrix} = (x_1 y_2 + \ldots x_8 y_1) - (x_2 y_1 + \ldots x_1 y_8)$$

Eq. 3 where $A_1$ is a function of outer lip descriptor points ($x_{1\ldots8}$, $y_{1\ldots8}$).

In some examples, the area 406 of the square generated by the extreme points of the lips can be calculated using the equation:

$$A_2 = \|x_1 - x_5\|^2$$

Eq. 4 where the area $A_2$ is a function of the extreme descriptor points $x_1$ and $x_5$, corresponding to vertices 410 on the left and the right of the lips.

In some examples, the areas 406, 408 may then be used to calculate the area ratio feature using the equation:

$$r_a = \frac{A_1}{A_2}$$

Eq. 5 where the area ratio feature $r_a$ is a function of a first area $A_1$ and a second area $A_2$, corresponding to areas 408 and 406, respectively. In some examples, the area ratio feature can then be included as one of the descriptor features used to generate the visual pattern as described in FIG. 8 below and displayed in an example in FIG. 9. In some examples, an area ratio feature with a value greater than a threshold area ratio may indicate the presence of lip activity. For example, lip activity may be correlated to speech activity.

The diagram of FIG. 4 is not intended to indicate that the example area ratio feature 400 is to include all of the components shown in FIG. 4. Rather, the example area ratio feature 400 can be implemented using fewer or additional components not illustrated in FIG. 4 (e.g., additional areas, descriptor points, etc.).

Figure 5:
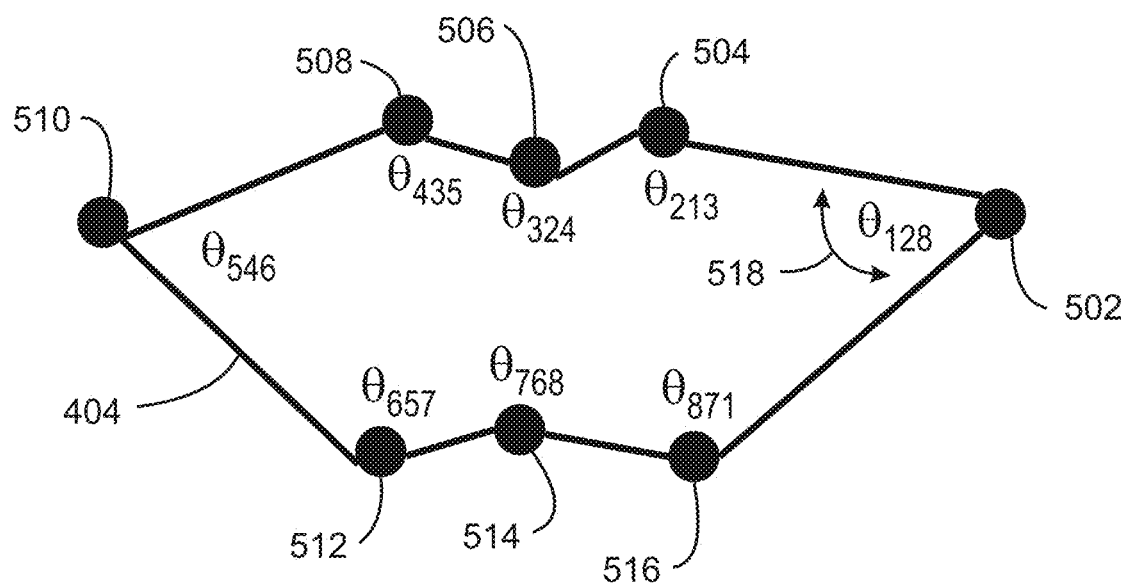
FIG. 5 is a diagram illustrating an example set of lip descriptor points.

FIG. 5 is a diagram illustrating an example set of lip descriptor points. The example set of lip descriptor points are generally referred to by the reference number 500 and can be implemented in the computing device 1200 below. For example, the set of lip descriptor points 500 can be generated using the landmark detector 112 of the computer device 104 of FIG. 1, the landmark detector 1232 of the computing device 1200 of FIG. 12 below, or the landmark detector module 1308 of the computer readable media 1300 of FIG. 13 below.

In FIG. 5, eight of lip descriptor points 502, 504, 506, 508, 510, 512, 514, 516 are connected by line segments 404 connected with internal angles 518. In some examples, a 24 component vector of 24 descriptor features can be calculated based on the internal angles 518. The internal angles 518 of the lips can be calculated using the equation:

$$\theta_{ijk} = \cos^{-1}\left(\frac{(V_j - V_i) \cdot (V_k - V_i)}{|V_j - V_i||V_k - V_i|}\right)$$

Eq. 6 where $V_i$, $V_j$, and $V_k$ are verticies of the two line segments forming the internal angle $\theta_{ijk}$. In some examples, a subset of possible internal angles may be used to avoid redundancies. For example, the internal angles can be defined by the set:

$$x = \begin{bmatrix} \{1, 3, 7\}, \{1, 4, 6\}, \{5, 2, 8\}, \{5, 3, 7\}, \{5, 4, 6\}, \{1, 5, 2\} \\ \{1, 5, 3\}, \{1, 5, 4\}, \{5, 1, 7\}, \{5, 1, 6\}, \{7, 1, 5\}, \{3, 1, 5\} \end{bmatrix}$$

Eq. 7 where x is the set of internal angles to be used and the numbers 1-8 correspond to the eight descriptor points 502, 504, 506, 508, 510, 512, 514, 516. Each one of the 12 combinations in the set x can generate an angle component value for the component vector. In addition, eight inner points of the lips can be used to generate another set of 12 angles using the same approach. For example, the inner points may be the inner lip descriptor points described in FIG. 7 below. Thus, a total of 24 internal angle descriptor features can be generated based on the internal angles.

In some examples, an additional descriptor feature can be generated using a cross ratio of four of the vertices. For example, the cross ratio can be calculated using the vertices 502, 504, 510, and 512. The cross ratio feature can be calculated using an equation described with respect to FIG. 7 below.

The diagram of FIG. 5 is not intended to indicate that the example set of lip descriptor points 500 is to include all of the components shown in FIG. 5. Rather, the example set of lip descriptor points 500 can be implemented using fewer or additional components not illustrated in FIG. 5 (e.g., additional internal angles, vertices, lip descriptor points, etc.).

Figure 6:
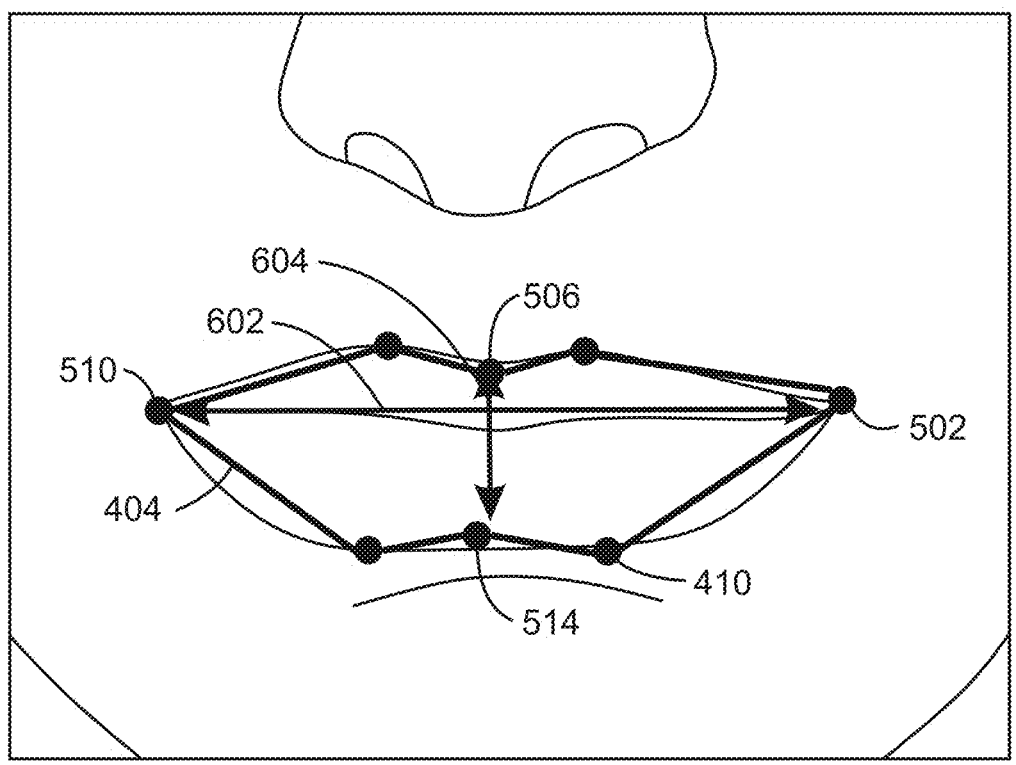
FIG. 6 is a diagram illustrating an example eccentricity feature.

FIG. 6 is a diagram illustrating an example eccentricity feature. The example eccentricity feature is generally referred to by the reference number 600 and can be implemented in the computing device 1200 below. For example, the eccentricity feature 600 can be generated using the descriptor calculator 114 of the computer device 104 of FIG. 1, the descriptor calculator 1234 of the computing device 1200 of FIG. 12 below, or the descriptor calculator module 1310 of the computer readable media 1300 of FIG. 13 below.

FIG. 6 includes a set of line segments 404 connected by vertices 410 surrounding a set of lips. A vertical double-sided arrow 506 indicates a distance between vertices 502 and 510. A horizontal double-sided arrow 604 indicates a distance between vertices 506 and 514.

In the example of FIG. 6, an eccentricity feature can be calculated based on the eccentricity of an ellipse generated by the lip descriptor points, or vertices, on the border of the lips. For example, the eccentricity feature can be calculated using the equation:

$$r_e = \frac{\|V_3 - V_7\|}{\|V_1 - V_5\|} \qquad \text{Eq. 8}$$

where the eccentricity feature $r_e$ is a function of vertices $V_1$, $V_3$, $V_5$, $V_7$ corresponding to vertices 502, 506, 510, and 514, respectively. In some examples, the eccentricity feature can be included as one of the descriptor features used to generate the visual pattern as described in FIG. 8 below and displayed in an example in FIG. 9.

The diagram of FIG. 6 is not intended to indicate that the example eccentricity feature 600 is to include all of the components shown in FIG. 6. Rather, the example eccentricity feature 600 can be implemented using fewer or additional components not illustrated in FIG. 6 (e.g., additional line segments, vertices, etc.).

Figure 7:
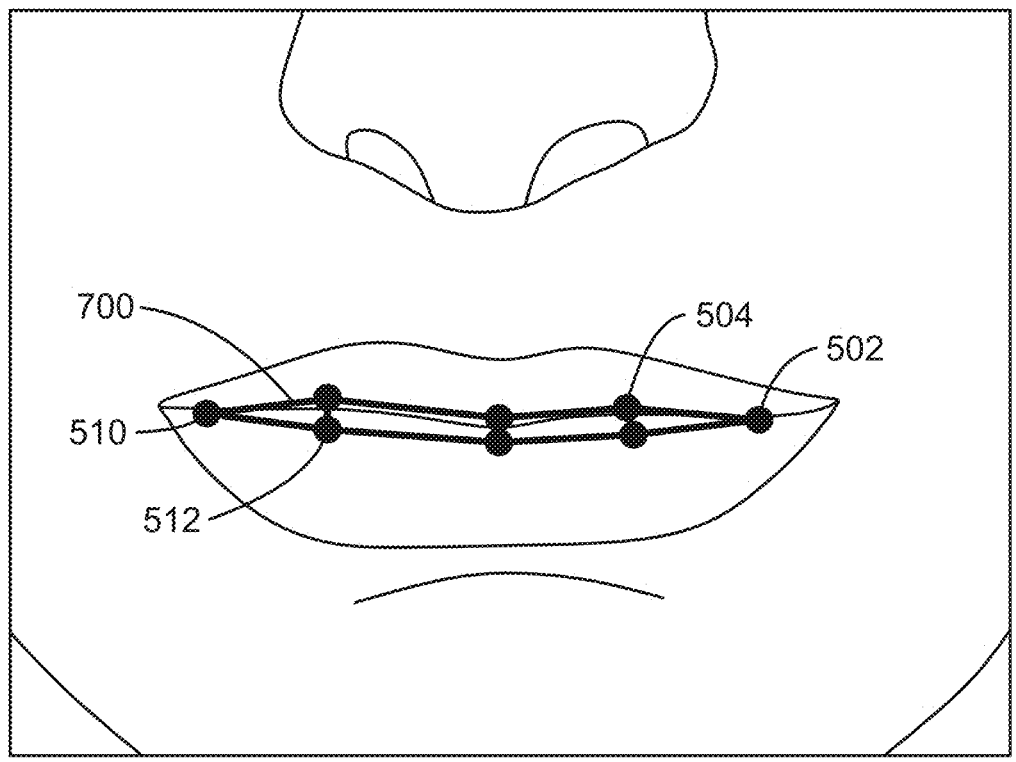
FIG. 7 is a diagram illustrating an example cross-ratio feature.

FIG. 7 is a diagram illustrating an example cross-ratio feature. The example cross-ratio feature is generally referred to by the reference number 700 and can be implemented in the computing device 1200 below. For example, the cross-ratio feature 700 can be generated using the descriptor calculator 114 of the computer device 104 of FIG. 1, the descriptor calculator 1234 of the computing device 1200 of FIG. 12 below, or the descriptor calculator module 1310 of the computer readable media 1300 of FIG. 13 below.

FIG. 7 shows a number of line segments 700 connected by a number of vertices, including vertices 502, 504, 510, and 512. For example, the vertices may be inner descriptor points used to calculate the cross-ratio. In the example of FIG. 7, a cross-ratio feature can be calculate using the equation:

$$r_{cr} = \frac{\|V_1 - V_6\|\|V_2 - V_5\|}{\|V_2 - V_6\|\|V_1 - V_5\|} \qquad \text{Eq. 9}$$

where the cross-ratio feature $r_{cr}$ is a function of the vertices $V_1$, $V_2$, $V_5$, $V_6$, corresponding to vertices 502, 504, 510, and 512, respectively. In some examples, the cross-ratio feature can be included as one of the descriptor features used to generate the visual pattern as described in FIG. 8 below and displayed in an example in FIG. 9.

The diagram of FIG. 7 is not intended to indicate that the example cross-ratio feature 700 is to include all of the components shown in FIG. 7. Rather, the example cross-ratio feature 700 can be implemented using fewer or additional components not illustrated in FIG. 7 (e.g., additional line segments, vertices, etc.).

Figure 8:
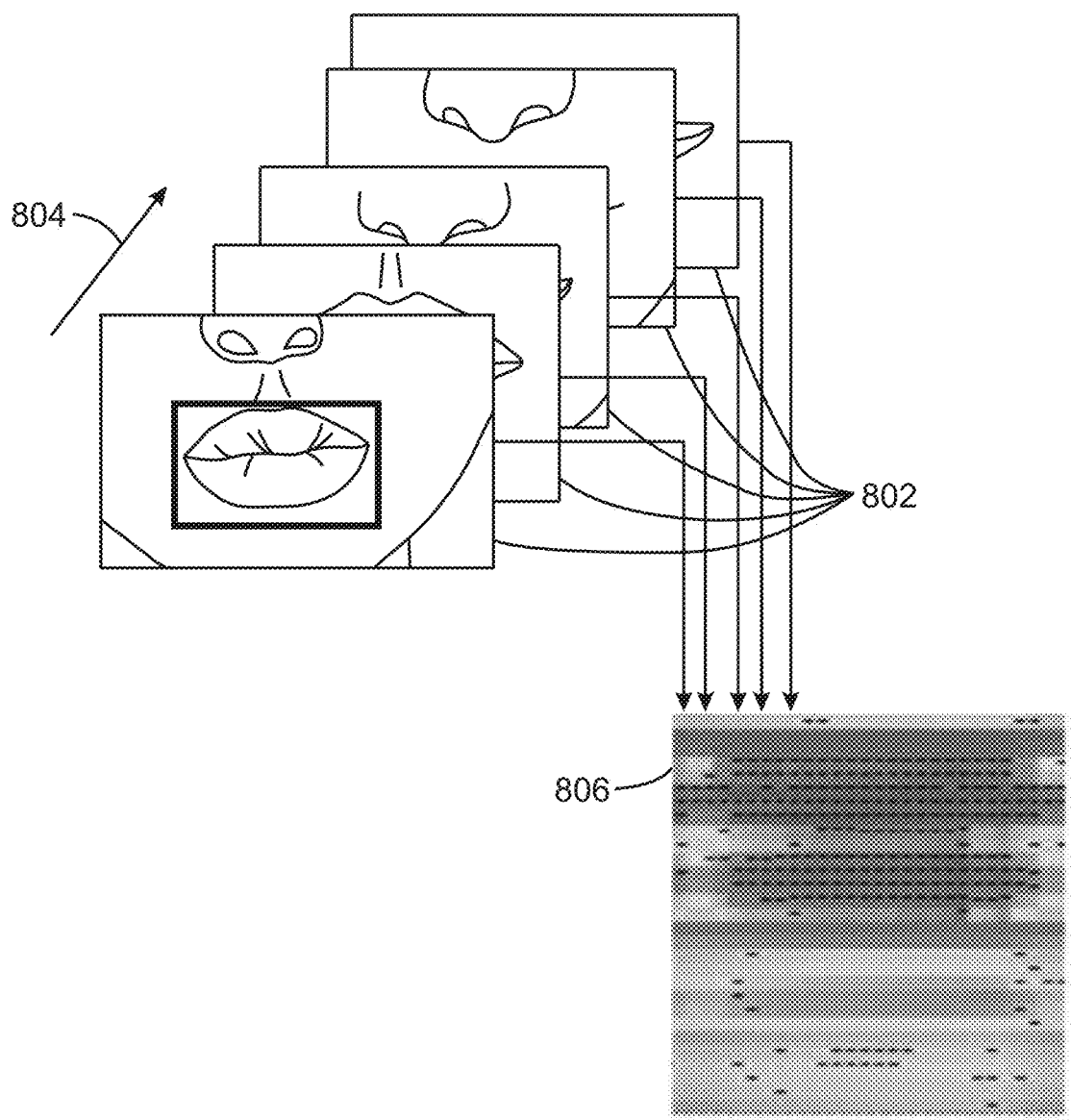
FIG. 8 is a diagram illustrating an example set of descriptor features used to generate a visual pattern.

FIG. 8 is a diagram illustrating an example set of descriptor features used to generate a visual pattern. The example set of descriptor features are generally referred to by the reference number 800 and can be implemented in the computing device 1200 below. For example, the set of descriptor features 800 can be generated using the descriptor calculator 114 of the computer device 104 of FIG. 1, the descriptor calculator 1234 of the computing device 1200 of FIG. 12 below, or the descriptor calculator module 1310 of the computer readable media 1300 of FIG. 13 below. In some examples, the set of descriptor features 800 may include any of the descriptor features described in FIGS. 3-7.

In the example of FIG. 8, as series of generated descriptor features 802 corresponding to images of lips over time 804 are included into a generated visual pattern 806. For example, the extracted descriptor features for any point in time may be arranged into a column. In some examples, lip descriptor feature vectors of size 29 may be arranged as columns. The columns of extracted descriptor features over time 804 may then be concatenated horizontally to produce the visual pattern 806. For example, the visual pattern 806 may form a feature matrix showing patterns in the descriptor features corresponding to lip patterns over the time period 804. This pattern thus codifies movements of the lips over time. In some examples, if a camera resolution is ~29 frames per second (FPS), then each of the descriptor feature vectors (time blocks) can be calculated approximately at a frequency of $\frac{1}{29}$ of a second. For example, the descriptor feature vectors may be calculated at a time resolution of approximately 34.5 milliseconds (ms). In some examples, a fixed window of one second may be used as a time frame for a recognizable keyword utterance. For example, this may result in a 29 descriptor feature by 29 time block feature matrix.

Thus, a voice recognition problem may be transformed into a pattern recognition problem. The transformation may enable known powerful tools such as Convolutional Neural Networks (CNN) to be used as a speech recognition engine. Moreover, each of the descriptor features 802 may be scale and rotation invariant. Thus, the lips may be described by the various descriptor features 802 at any point in time regardless of the rotation or scale of the lips.

The diagram of FIG. 8 is not intended to indicate that the example set of descriptor features 800 is to include all of the components shown in FIG. 8. Rather, the example set of descriptor features 800 can be implemented using fewer or additional components not illustrated in FIG. 8 (e.g., additional descriptor features, etc.).

Figure 9:
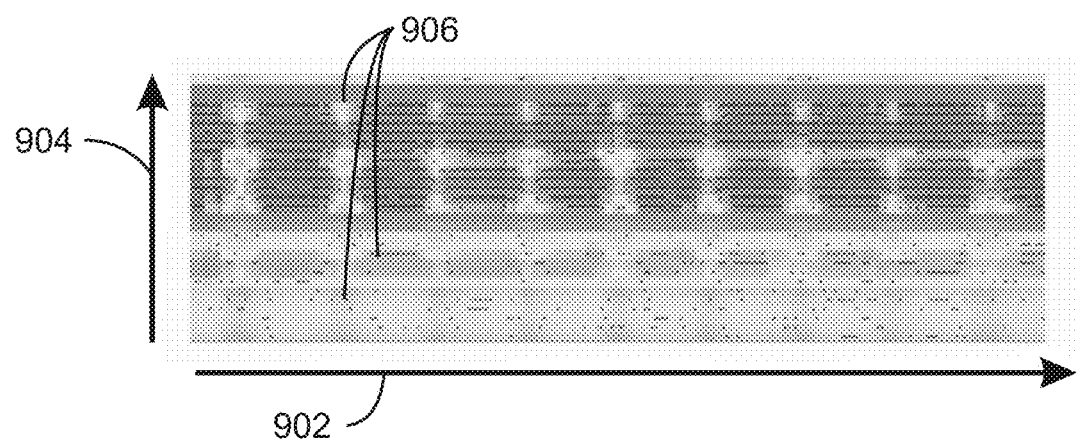
FIG. 9 is a diagram illustrating an example visual pattern.

FIG. 9 is a diagram illustrating an example visual pattern. The example visual pattern is generally referred to by the reference number 900 and can be implemented in the computing device 1200 below. For example, the visual pattern 900 can be generated using the pattern generator 116 of the computer device 104 of FIG. 1, the pattern generator 1236 of the computing device 1200 of FIG. 12 below, or the pattern generator module 1312 of the computer readable media 1300 of FIG. 13 below.

As shown in FIG. 9, the visual pattern 900 may include any number of time blocks 902 and any size of descriptor feature vectors 904. For example, the visual pattern 900 may have a descriptor feature vector 904 size of 29. In some examples, the time blocks 902 may have a resolution of approximately 34.5 milliseconds.

Based on the visible patterns 906 generated by concatenating the descriptor feature vectors 904 over time, any suitable speech recognizer may then be used to recognize speech based on the patterns 906. For example, the CNN of FIG. 10 may then be used to recognize speech based on the patterns 906.

The diagram of FIG. 9 is not intended to indicate that the example visual pattern 900 is to include all of the components shown in FIG. 9. Rather, the example visual pattern 900 can be implemented using fewer or additional components not illustrated in FIG. 9 (e.g., additional patterns, time blocks, descriptor features, etc.).

Figure 10:
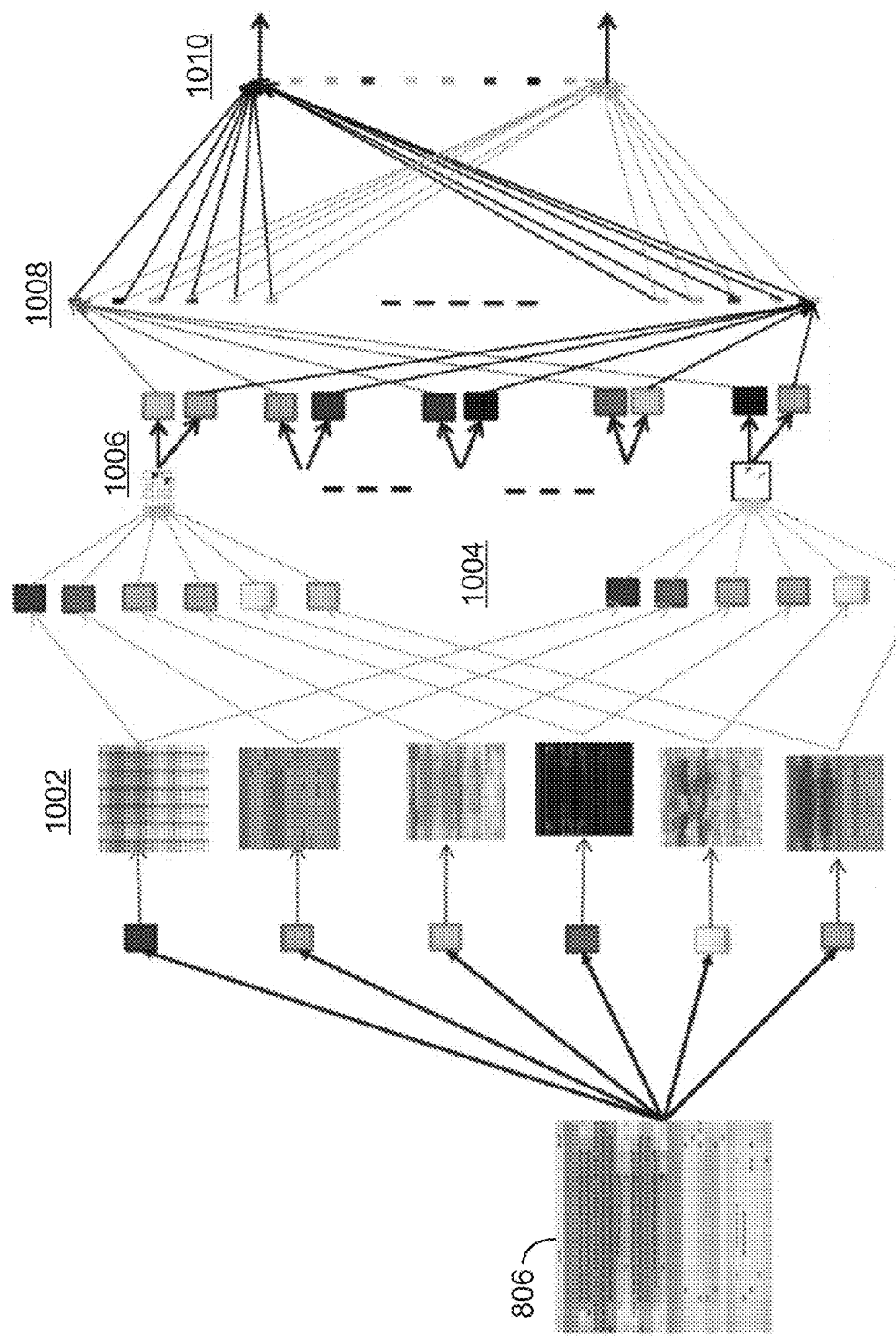
FIG. 10 is a diagram illustrating an example convolutional neural network used to detect speech based on a visual pattern.

FIG. 10 is a diagram illustrating an example convolutional neural network (CNN) used to detect speech based on a visual pattern. The example CNN is generally referred to by the reference number 1000 and can be implemented in the computing device 1200 below. For example, the CNN 1000 can be generated using the pattern generator 116 of the computer device 104 of FIG. 1, the pattern generator 1236 of the computing device 1200 of FIG. 12 below, or the pattern generator module 1312 of the computer readable media 1300 of FIG. 13 below.

The example CNN 1000 includes a first layer 1002, a second layer 1004 to generate output 1006, a third layer 1008 to generate output 1010. The CNN 1000 may process an input feature matrix 806. For example, the CNN 1000 can sweep through one second of features at $1/29$ FPS.

As shown in FIG. 10, the first layer 1002 may include six kernels with 5×5 weights. For example, the first layer may receive a 29×29 feature matrix and output six 13×13 images. The second layer 1004 may include 50 kernels with 5×5 weights and generate output 1006. The third layer 1008 may be a fully connected layer with 100 hidden neurons (not shown). The third layer 1008 may receive output 1006 from the second layer 1004 and output one or more recognized keywords 1010.

The diagram of FIG. 10 is not intended to indicate that the CNN 1000 is to include all of the components shown in FIG. 10. Rather, the example CNN 1000 can be implemented using fewer or additional components not illustrated in FIG. 10 (e.g., additional layers, etc.).

Figure 11:
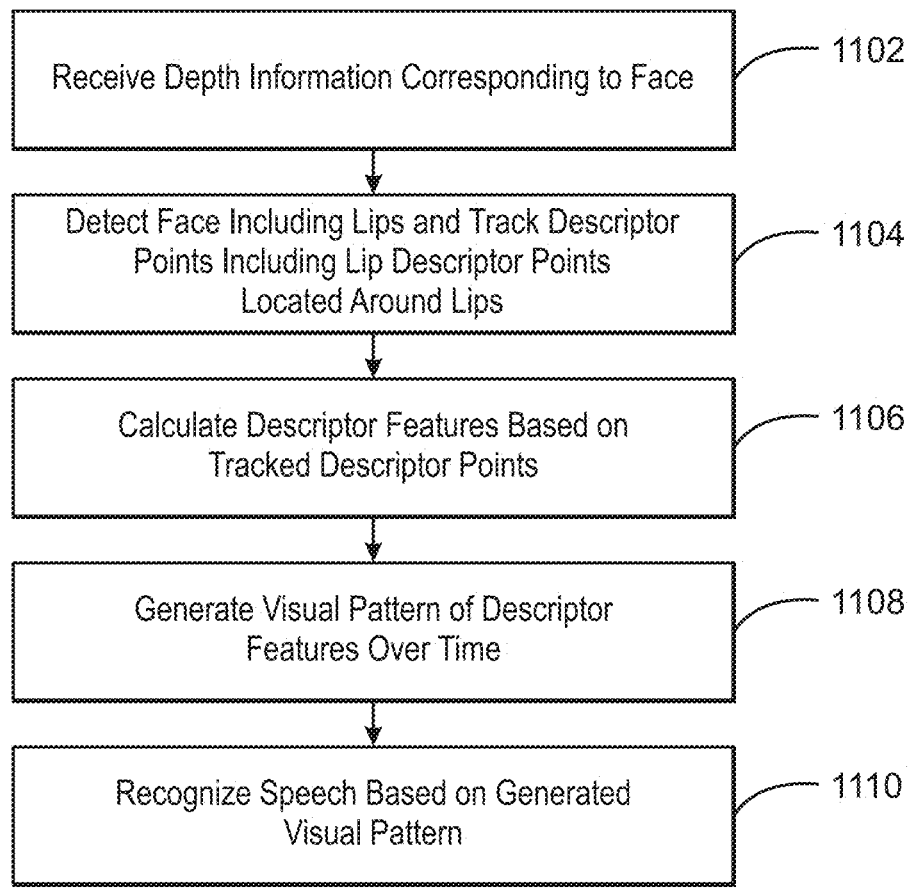
FIG. 11 is a flow chart illustrating a method for recognizing speech using depth information.

FIG. 11 is a flow chart illustrating a method for recognizing speech using depth information. The example method is generally referred to by the reference number 1100 and can be implemented in the computer device 104 of FIG. 1 above, the processor 1202 of the computing device 1200 of FIG. 12 below, or the computer readable media 1300 of FIG. 13 below.

At block 1102, a processor receives depth information corresponding to a face. For example, the depth information can include a number of facial descriptor points and a number of lip descriptor points.

At block 1104, the processor detects the face comprising lips and tracks a plurality of descriptor points including lip descriptor points located around the lips. For example, the processor can track eight lip descriptor points located around a contour of the lips.

At block 1106, the processor calculates a plurality of descriptor features based on the tracked descriptor points. In some examples, the processor can generate a vector based on detected internal angles between the lip descriptor points. For example, the lip descriptor points may be the lip descriptor points described with respect to FIGS. 5 and 6 above. In some examples, the processor can generate a vector based on detected internal angles between inner lip descriptor points. For example, the inner lip descriptor points may be the inner descriptor points described with respect to FIG. 7 above. In some examples, the processor can calculate a cross ratio of four detected vertices of the lip descriptor points. For example, the processor can calculate the cross ratio using Eq. 9 of FIG. 7 above. In some examples, the processor can calculate a line segment ratio based on a line segment between eyes of the face and a line segment on the lips. For example, the processor can calculate the line segment ratio using Eq. 1 of FIG. 3 above. In some examples, the processor can calculate an area ratio based a first area within the lip descriptor points and a second area within a bounding box and outside the lip descriptor points. For example, the processor can calculate the area ratio using Eq. 5 of FIG. 4 above. In some examples, the processor can calculate an eccentricity feature based on eccentricity of an ellipse generated by the lip descriptor points. For example, the eccentricity feature may be generated using Eq. 8 of FIG. 6 above.

At block 1108, the processor generates a visual pattern of the descriptor features over time. For example, the processor can arrange the plurality of descriptor features as a column for a given point in time.

At block 1110, the processor recognizes speech based on the generated visual pattern. For example, the processor may use a CNN to classify the generated visual pattern based on a pre-trained dictionary. For example, the CNN may have been pre-trained by the processor using the dictionary.

This process flow diagram is not intended to indicate that the blocks of the example process 1100 are to be executed in any particular order, or that all of the blocks are to be included in every case. Further, any number of additional blocks not shown may be included within the example process 1100, depending on the details of the specific implementation.

Figure 12:
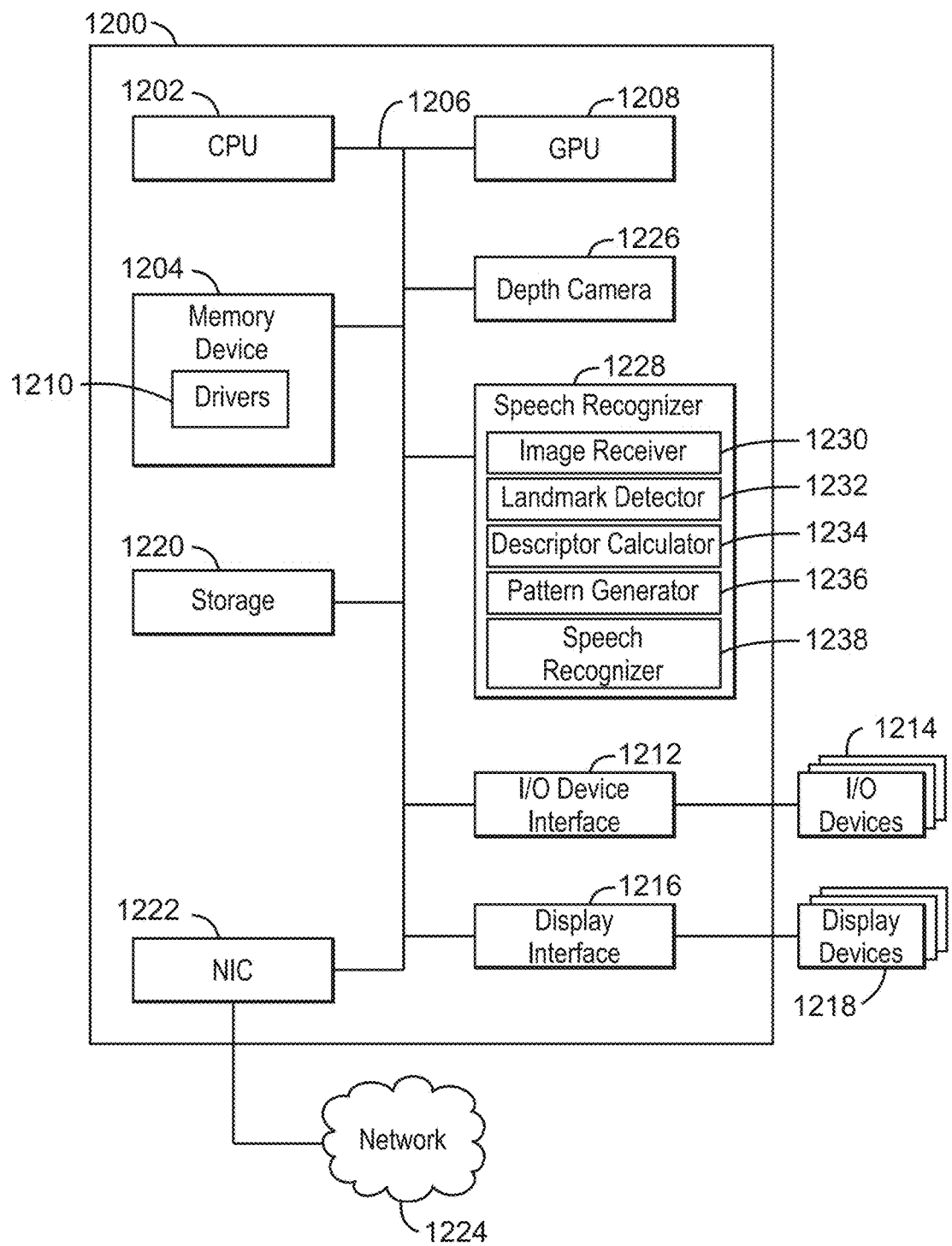
FIG. 12 is block diagram illustrating an example computing device that can recognize speech using depth information.

Referring now to FIG. 12, a block diagram is shown illustrating an example computing device that can recognize speech using depth information. The computing device 1200 may be, for example, a laptop computer, desktop computer, tablet computer, mobile device, or wearable device, among others. In some examples, the computing device 1200 may be a smart camera or a digital security surveillance camera. The computing device 1200 may include a central processing unit (CPU) 1202 that is configured to execute stored instructions, as well as a memory device 1204 that stores instructions that are executable by the CPU 1202. The CPU 1202 may be coupled to the memory device 1204 by a bus 1206. Additionally, the CPU 1202 can be a single core processor, a multi-core processor, a computing cluster, or any number of other configurations. Furthermore, the computing device 1200 may include more than one CPU 1202. In some examples, the CPU 1202 may be a system-on-chip (SoC) with a multi-core processor architecture. In some examples, the CPU 1202 can be a specialized digital signal processor (DSP) used for image processing. The memory device 1204 can include random access memory (RAM), read only memory (ROM), flash memory, or any other suitable memory systems. For example, the memory device 1204 may include dynamic random access memory (DRAM).

The memory device 1204 can include random access memory (RAM), read only memory (ROM), flash memory, or any other suitable memory systems. For example, the memory device 1204 may include dynamic random access memory (DRAM). The memory device 1204 may include device drivers 1210 that are configured to execute the instructions for device discovery. The device drivers 1210 may be software, an application program, application code, or the like.

The computing device 1200 may also include a graphics processing unit (GPU) 1208. As shown, the CPU 1202 may be coupled through the bus 1206 to the GPU 1208. The GPU

1208 may be configured to perform any number of graphics operations within the computing device 1200. For example, the GPU 1208 may be configured to render or manipulate graphics images, graphics frames, videos, or the like, to be displayed to a user of the computing device 1200.

The memory device 1204 can include random access memory (RAM), read only memory (ROM), flash memory, or any other suitable memory systems. For example, the memory device 1204 may include dynamic random access memory (DRAM). The memory device 1204 may include device drivers 1210 that are configured to execute the instructions for generating virtual input devices. The device drivers 1210 may be software, an application program, application code, or the like.

The CPU 1202 may also be connected through the bus 1206 to an input/output (I/O) device interface 1212 configured to connect the computing device 1200 to one or more I/O devices 1214. The I/O devices 1214 may include, for example, a keyboard and a pointing device, wherein the pointing device may include a touchpad or a touchscreen, among others. The I/O devices 1214 may be built-in components of the computing device 1200, or may be devices that are externally connected to the computing device 1200. In some examples, the memory 1204 may be communicatively coupled to I/O devices 1214 through direct memory access (DMA).

The CPU 1202 may also be linked through the bus 1206 to a display interface 1216 configured to connect the computing device 1200 to a display device 1218. The display device 1218 may include a display screen that is a built-in component of the computing device 1200. The display device 1218 may also include a computer monitor, television, or projector, among others, that is internal to or externally connected to the computing device 1200.

The computing device 1200 also includes a storage device 1220. The storage device 1220 is a physical memory such as a hard drive, an optical drive, a thumbdrive, an array of drives, a solid-state drive, or any combinations thereof. The storage device 1220 may also include remote storage drives.

The computing device 1200 may also include a network interface controller (NIC) 1222. The NIC 1222 may be configured to connect the computing device 1200 through the bus 1206 to a network 1224. The network 1224 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 1200 further includes a depth camera 1226. For example, the depth camera may include one or more depth sensors. In some example, the depth camera may include a processor to generate depth information. For example, the depth camera 1226 may include functionality such as RealSense™ technology.

The computing device 1200 further includes a speech recognizer device 1228. For example, the speech recognizer 1228 can be used to recognize speech using depth information according to techniques described herein. The speech recognizer 1228 can include an image receiver 1230, a landmark detector 1232, a descriptor calculator 1234, a pattern generator 1236, and a speech recognizer 1238. The image receiver 1230 can receive depth information corresponding to a face. For example, the depth information can correspond to an image of the face with at least a partial occlusion of the lips. In some examples, the partial occlusion of the lips may be 10% or less. The landmark detector 1232 can detect the face comprising lips and track a plurality of descriptor points comprising lip descriptor points located around the lips. The descriptor calculator 1234 can calculate a plurality of descriptor features based on the tracked descriptor points. For example, the descriptor calculator 1234 can calculate the descriptor features based on detected angles between the lip descriptor points. In some examples, the descriptor calculator 1234 can calculate the descriptor features based on detected internal angles between the lip descriptor points. In some examples, the descriptor features can include a line segment ratio feature, an area ratio feature, an eccentricity feature, a cross ratio feature, or any combination thereof. For example, these descriptor features can be calculated as described above. The pattern generator 1236 can generate a visual pattern of the descriptor features over time. In some examples, the visual pattern may be a feature matrix. For example, the feature matrix can include a number of descriptor features over time. The speech recognizer 1238 can recognize speech based on the generated visual pattern. In some examples, the speech recognizer 1238 may be a pre-trained CNN. For example, the CNN may be pre-trained to recognize a plurality of keywords. In some examples, the CNN may be pretrained using a dictionary of keywords to be recognized.

The block diagram of FIG. 12 is not intended to indicate that the computing device 1200 is to include all of the components shown in FIG. 12. Rather, the computing device 1200 can include fewer or additional components not illustrated in FIG. 12, such as additional buffers, additional processors, and the like. The computing device 1200 may include any number of additional components not shown in FIG. 12, depending on the details of the specific implementation. Furthermore, any of the functionalities of the CPU 1202 may be partially, or entirely, implemented in hardware and/or in a processor. For example, the functionality of the speech recognizer 1228 may be implemented with an application specific integrated circuit, in logic implemented in a processor, in logic implemented in a specialized graphics processing unit such as the GPU 1208, or in any other device.

Figure 13:
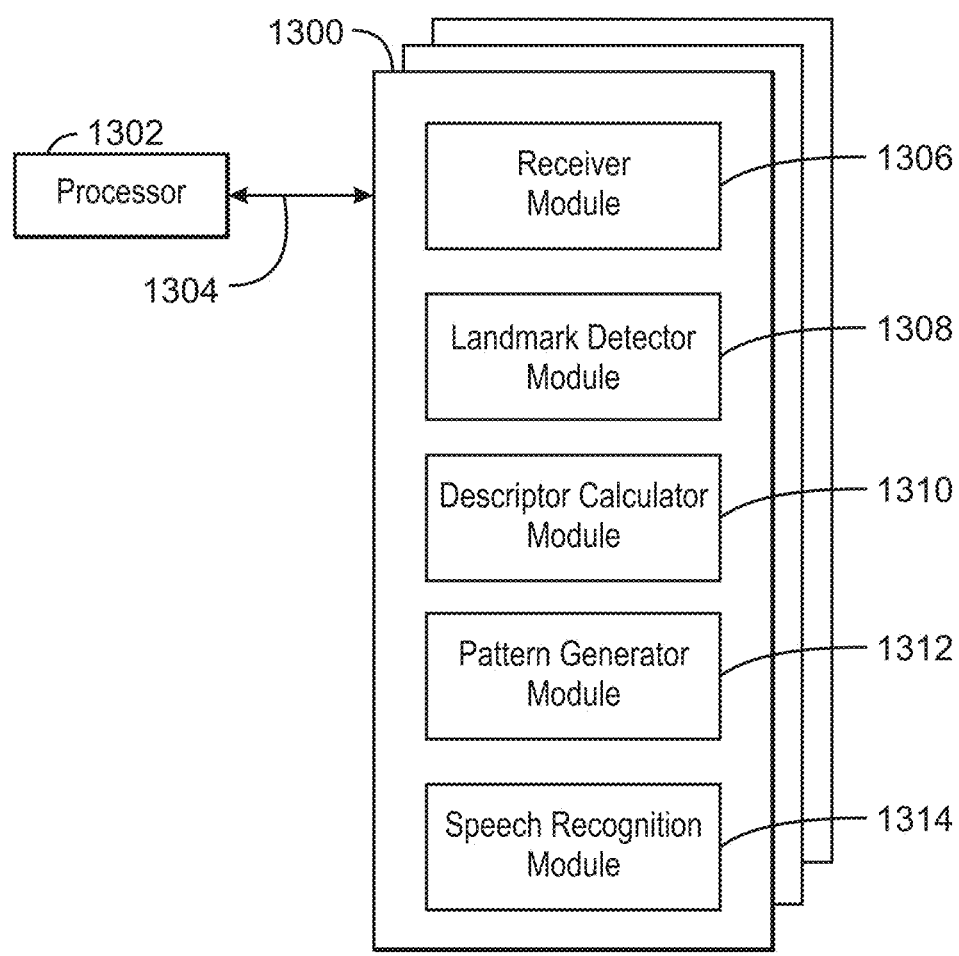
FIG. 13 is a block diagram showing computer readable media that store code for recognition of speech using depth information.

FIG. 13 is a block diagram showing computer readable media 1300 that store code for recognition of speech using depth information. The computer readable media 1300 may be accessed by a processor 1302 over a computer bus 1304. Furthermore, the computer readable medium 1300 may include code configured to direct the processor 1302 to perform the methods described herein. In some embodiments, the computer readable media 1300 may be non-transitory computer readable media. In some examples, the computer readable media 1300 may be storage media.

The various software components discussed herein may be stored on one or more computer readable media 1300, as indicated in FIG. 13. For example, a receiver module 1306 may be configured to receive depth information corresponding to a face. A landmark detector module 1308 may be configured to detect the face including lips and track a plurality of descriptor points including lip descriptor points located around the lips. In some examples, the landmark detector module 1308 may be configured to track eight lip descriptor points located around a contour of the lips. A descriptor calculator module 1310 may be configured to calculate a plurality of descriptor features based on the tracked descriptor points. For example, the descriptor calculator 1310 may be configured to generate a vector based on detected internal angles between the lip descriptor points.

In some examples, the descriptor calculator 1310 may be configured to calculate a cross ratio of four detected vertices of the lip descriptor points. In some examples, the descriptor calculator 1310 may be configured to calculate a line segment ratio based on a line segment between eyes of the face and a line segment on the lips. In some examples, the descriptor calculator 1310 may be configured to calculate an area ratio based a first area within the lip descriptor points and a second area within a bounding box and outside the lip descriptor points. In some examples, the descriptor calculator 1310 may be configured to generate a vector based on detected internal angles between inner lip descriptor points. In some examples, the descriptor calculator 1310 may be configured to calculate an eccentricity feature based on eccentricity of an ellipse generated by the lip descriptor points. A pattern generator module 1312 may be configured to generate a visual pattern of the descriptor features over time. For example, the pattern generator module 1312 may be configured to arrange the plurality of descriptor features as a column in the generated visual pattern for a given point in time. A speech recognition module 1314 may be configured to recognize speech based on the generated visual pattern. For example, the speech recognition module 1314 may be configured to classify the generated visual pattern based on a pre-trained dictionary via a CNN. For example, the CNN may be pre-trained using the dictionary.

The block diagram of FIG. 13 is not intended to indicate that the computer readable media 1300 is to include all of the components shown in FIG. 13. Further, the computer readable media 1300 may include any number of additional components not shown in FIG. 13, depending on the details of the specific implementation.

EXAMPLES

Example 1 is an apparatus for recognizing speech using depth information. The apparatus includes an image receiver to receive depth information corresponding to a face. The apparatus also includes a landmark detector to detect the face including lips and track a plurality of descriptor points including lip descriptor points located around the lips. The apparatus further includes a descriptor calculator to calculate a plurality of descriptor features based on the tracked descriptor points. The apparatus also further includes a pattern generator to generate a visual pattern of the descriptor features over time. The apparatus further includes a speech recognizer to recognize speech based on the generated visual pattern.

Example 2 includes the apparatus of example 1, including or excluding optional features. In this example, the descriptor calculator is to calculate the descriptor features based on detected angles between the lip descriptor points.

Example 3 includes the apparatus of any one of examples 1 to 2, including or excluding optional features. In this example, the descriptor calculator is to calculate the descriptor features based on detected internal angles between the lip descriptor points.

Example 4 includes the apparatus of any one of examples 1 to 3, including or excluding optional features. In this example, the descriptor features include a line segment ratio feature.

Example 5 includes the apparatus of any one of examples 1 to 4, including or excluding optional features. In this example, the descriptor features include an area ratio feature.

Example 6 includes the apparatus of any one of examples 1 to 5, including or excluding optional features. In this example, the descriptor features include an eccentricity feature.

Example 7 includes the apparatus of any one of examples 1 to 6, including or excluding optional features. In this example, the descriptor features include a cross ratio feature.

Example 8 includes the apparatus of any one of examples 1 to 7, including or excluding optional features. In this example, the visual pattern includes a feature matrix.

Example 9 includes the apparatus of any one of examples 1 to 8, including or excluding optional features. In this example, the speech recognizes includes a pre-trained convolutional neural network (CNN), the CNN pre-trained to recognize a plurality of keywords.

Example 10 includes the apparatus of any one of examples 1 to 9, including or excluding optional features. In this example, the depth information corresponds to an image of the face with at least a partial occlusion of the lips.

Example 11 is a method for recognizing speech using depth information. The method includes receiving, via a processor, depth information corresponding to a face. The method includes detecting, via the processor, the face including lips and tracking, via the processor, a plurality of descriptor points including lip descriptor points located around the lips. The method includes calculating, via the processor, a plurality of descriptor features based on the tracked descriptor points. The method includes generating, via the processor, a visual pattern of the descriptor features over time. The method includes recognizing, via the processor, speech based on the generated visual pattern.

Example 12 includes the method of example 11, including or excluding optional features. In this example, calculating the plurality of descriptor features includes generating a vector based on detected internal angles between outer lip descriptor points.

Example 13 includes the method of any one of examples 11 to 12, including or excluding optional features. In this example, calculating the plurality of descriptor features includes calculating a cross ratio of four detected vertices of the lip descriptor points.

Example 14 includes the method of any one of examples 11 to 13, including or excluding optional features. In this example, generating the visual pattern includes arranging the plurality of descriptor features as a column for a given point in time.

Example 15 includes the method of any one of examples 11 to 14, including or excluding optional features. In this example, detecting the speech includes using a convolutional neural network to classify the generated visual pattern based on a pre-trained dictionary.

Example 16 includes the method of any one of examples 11 to 15, including or excluding optional features. In this example, tracking the lip descriptor points includes tracking eight lip descriptor points located around a contour of the lips.

Example 17 includes the method of any one of examples 11 to 16, including or excluding optional features. In this example, calculating the plurality of descriptor features includes calculating a line segment ratio based on a line segment between eyes of the face and a line segment on the lips.

Example 18 includes the method of any one of examples 11 to 17, including or excluding optional features. In this example, calculating the plurality of descriptor features includes calculating an area ratio based a first area within the lip descriptor points and a second area within a bounding box and outside the lip descriptor points.

Example 19 includes the method of any one of examples 11 to 18, including or excluding optional features. In this example, calculating the plurality of descriptor features includes generating a vector based on detected internal angles between inner lip descriptor points.

Example 20 includes the method of any one of examples 11 to 19, including or excluding optional features. In this example, calculating the plurality of descriptor features includes calculating an eccentricity feature based on eccentricity of an ellipse generated by the lip descriptor points.

Example 21 is at least one computer readable medium for recognizing speech using depth information having instructions stored therein that. The computer-readable medium includes instructions that direct the processor to receive depth information corresponding to a face. The computer-readable medium includes instructions that direct the processor to detect the face including lips and track a plurality of descriptor points including lip descriptor points located around the lips. The computer-readable medium includes instructions that direct the processor to calculate a plurality of descriptor features based on the tracked descriptor points. The computer-readable medium includes instructions that direct the processor to generate a visual pattern of the descriptor features over time. The computer-readable medium includes instructions that direct the processor to recognize speech based on the generated visual pattern.

Example 22 includes the computer-readable medium of example 21, including or excluding optional features. In this example, the computer-readable medium includes instructions to generate a vector based on detected internal angles between the lip descriptor points.

Example 23 includes the computer-readable medium of any one of examples 21 to 22, including or excluding optional features. In this example, the computer-readable medium includes instructions to calculate a cross ratio of four detected vertices of the lip descriptor points.

Example 24 includes the computer-readable medium of any one of examples 21 to 23, including or excluding optional features. In this example, the computer-readable medium includes instructions to arrange the plurality of descriptor features as a column in the generated visual pattern for a given point in time.

Example 25 includes the computer-readable medium of any one of examples 21 to 24, including or excluding optional features. In this example, the computer-readable medium includes instructions to classify the generated visual pattern based on a pre-trained dictionary via a convolutional neural network.

Example 26 includes the computer-readable medium of any one of examples 21 to 25, including or excluding optional features. In this example, the computer-readable medium includes instructions to track eight lip descriptor points located around a contour of the lips.

Example 27 includes the computer-readable medium of any one of examples 21 to 26, including or excluding optional features. In this example, the computer-readable medium includes instructions to calculate a line segment ratio based on a line segment between eyes of the face and a line segment on the lips.

Example 28 includes the computer-readable medium of any one of examples 21 to 27, including or excluding optional features. In this example, the computer-readable medium includes instructions to calculate an area ratio based a first area within the lip descriptor points and a second area within a bounding box and outside the lip descriptor points.

Example 29 includes the computer-readable medium of any one of examples 21 to 28, including or excluding optional features. In this example, the computer-readable medium includes instructions to generate a vector based on detected internal angles between inner lip descriptor points.

Example 30 includes the computer-readable medium of any one of examples 21 to 29, including or excluding optional features. In this example, the computer-readable medium includes instructions to calculate an eccentricity feature based on eccentricity of an ellipse generated by the lip descriptor points.

Example 31 is a system for recognizing speech using depth information. The system includes means for receiving depth information corresponding to a face. The system includes means for detecting the face including lips and tracking a plurality of descriptor points including lip descriptor points located around the lips. The system includes means for calculating a plurality of descriptor features based on the tracked descriptor points. The system includes means for generating a visual pattern of the descriptor features over time. The system includes means for recognizing speech based on the generated visual pattern.

Example 32 includes the system of example 31, including or excluding optional features. In this example, the means for calculating the plurality of descriptor features is to calculate the descriptor features based on detected angles between the lip descriptor points.

Example 33 includes the system of any one of examples 31 to 32, including or excluding optional features. In this example, the means for calculating the plurality of descriptor features is to calculate the descriptor features based on detected internal angles between the lip descriptor points.

Example 34 includes the system of any one of examples 31 to 33, including or excluding optional features. In this example, the descriptor features include a line segment ratio feature.

Example 35 includes the system of any one of examples 31 to 34, including or excluding optional features. In this example, the descriptor features include an area ratio feature.

Example 36 includes the system of any one of examples 31 to 35, including or excluding optional features. In this example, the descriptor features include an eccentricity feature.

Example 37 includes the system of any one of examples 31 to 36, including or excluding optional features. In this example, the descriptor features include a cross ratio feature.

Example 38 includes the system of any one of examples 31 to 37, including or excluding optional features. In this example, the visual pattern includes a feature matrix.

Example 39 includes the system of any one of examples 31 to 38, including or excluding optional features. In this example, the means for recognizing speech includes a pre-trained convolutional neural network (CNN), the CNN pre-trained to recognize a plurality of keywords.

Example 40 includes the system of any one of examples 31 to 39, including or excluding optional features. In this example, the depth information corresponds to an image of the face with at least a partial occlusion of the lips.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for recognizing speech using depth information, comprising a processor to:
   receive depth information corresponding to a face;
   detect the face comprising lips and track a plurality of descriptor points comprising lip descriptor points located around the lips;
   calculate a plurality of different descriptor features based on the tracked plurality of descriptor points, wherein at least one of the plurality of different descriptor features is calculated based on a line segment ratio of a line segment between two of the lip descriptor points and a line segment between eyes of the face;
   generate a feature matrix of the plurality of different descriptor features over time; and
   recognize speech based on the generated feature matrix.

2. The apparatus of claim 1, wherein the processor is to calculate the plurality of different descriptor features based on detected angles between the lip descriptor points.

3. The apparatus of claim 1, wherein the processor is to calculate the plurality of different descriptor features based on detected internal angles between the lip descriptor points.

4. The apparatus of claim 1, wherein the plurality of different descriptor features comprise a line segment ratio feature calculated based on the line segment ratio of the line segment between two of the lip descriptor points and the line segment between the eyes of the face.

5. The apparatus of claim 1, wherein the plurality of different descriptor features comprise an area ratio feature calculated based on an area ratio of outer lip descriptor points.

6. The apparatus of claim 1, wherein the plurality of different descriptor features comprise an eccentricity feature calculated based on an eccentricity of an ellipse generated based on the lip descriptor points.

7. The apparatus of claim 1, wherein the plurality of different descriptor features comprise a cross ratio feature calculated based on a cross ratio of four vertices of the lip descriptor points.

8. The apparatus of claim 1, wherein the processor comprises a pre-trained convolutional neural network (CNN), the CNN pre-trained to recognize a plurality of keywords.

9. The apparatus of claim 1, wherein the depth information corresponds to an image of the face with at least a partial occlusion of the lips.

10. The apparatus of claim 1, wherein the feature matrix comprises a plurality of concatenated descriptor feature vectors, each of the concatenated descriptor feature vectors calculated at a time resolution corresponding to a frame rate of a camera providing the depth information.

11. A method for recognizing speech using depth information, comprising:
    receiving, via a processor, depth information corresponding to a face;
    detecting, via the processor, the face comprising lips and tracking, via the processor, a plurality of descriptor points comprising lip descriptor points located around the lips;
    calculating, via the processor, a plurality of different descriptor features based on the tracked plurality of descriptor points, wherein at least one of the plurality of different descriptor features is calculated based on a line segment ratio of a line segment between two of the lip descriptor points and a line segment between eyes of the face;
    generating, via the processor, a feature matrix of the plurality of different descriptor features over time; and
    recognizing, via the processor, speech based on the generated feature matrix.

12. The method of claim 11, wherein calculating the plurality of different descriptor features comprises generating a vector based on detected internal angles between the lip descriptor points.

13. The method of claim 11, wherein calculating the plurality of different descriptor features comprises calculating a cross ratio of four detected vertices of the lip descriptor points.

14. The method of claim 11, wherein generating the feature matrix comprises arranging the plurality of different descriptor features as a column for a given point in time.

15. The method of claim 11, wherein detecting the speech comprises using a convolutional neural network to classify the generated feature matrix based on a pre-trained dictionary.

16. At least one non-transitory computer readable medium for recognizing speech using depth information having instructions stored therein that, in response to being executed on a computing device, cause the computing device to:
    receive depth information corresponding to a face;
    detect the face comprising lips and track a plurality of descriptor points comprising lip descriptor points located around the lips;

calculate a plurality of different descriptor features based on the tracked descriptor points, wherein at least one of the plurality of different descriptor features are calculated based on a line segment ratio of a line segment between two of the lip descriptor points and a line segment between eyes of the face;

generate a feature matrix of the plurality of different descriptor features over time; and recognize speech based on the generated feature matrix.

17. The at least one non-transitory computer readable medium of claim 16, comprising instructions to generate a vector based on detected internal angles between the lip descriptor points.

18. The at least one non-transitory computer readable medium of claim 16, comprising instructions to calculate a cross ratio of four detected vertices of the lip descriptor points.

19. The at least one non-transitory computer readable medium of claim 16, comprising instructions to arrange the plurality of different descriptor features as a column in the generated feature matrix for a given point in time.

20. The at least one non-transitory computer readable medium of claim 16, comprising instructions to classify the generated feature matrix based on a pre-trained dictionary via a convolutional neural network.

* * * * *